(12) United States Patent
Kim et al.

(10) Patent No.: US 11,380,056 B2
(45) Date of Patent: Jul. 5, 2022

(54) 3D OBJECT ACQUISITION METHOD AND APPARATUS USING ARTIFICIAL LIGHT PHOTOGRAPH

(71) Applicant: KOREA ADVANCED INSTITUTE OF SCIENCE AND TECHNOLOGY, Daejeon (KR)

(72) Inventors: Min Hyuk Kim, Daejeon (KR); Giljoo Nam, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 271 days.

(21) Appl. No.: 16/622,234

(22) PCT Filed: Oct. 7, 2019

(86) PCT No.: PCT/KR2019/013099
§ 371 (c)(1),
(2) Date: Dec. 12, 2019

(87) PCT Pub. No.: WO2020/076026
PCT Pub. Date: Apr. 16, 2020

(65) Prior Publication Data
US 2021/0358211 A1      Nov. 18, 2021

(30) Foreign Application Priority Data

Oct. 8, 2018    (KR) .................. 10-2018-0119872
Dec. 31, 2018   (KR) .................. 10-2018-0173852
Sep. 30, 2019   (KR) .................. 10-2019-0120410

(51) Int. Cl.
*G06K 9/00*      (2022.01)
*G06T 17/20*     (2006.01)
*G06T 7/586*     (2017.01)

(52) U.S. Cl.
CPC .............. *G06T 17/20* (2013.01); *G06T 7/586* (2017.01); *G06T 2207/10004* (2013.01); *G06T 2207/10028* (2013.01)

(58) Field of Classification Search
CPC .............. G01N 21/55; G01N 21/4738; G01N 2021/4711; G06T 15/50; G06T 17/00;
(Continued)

(56) References Cited

U.S. PATENT DOCUMENTS

2008/0218516 A1*   9/2008   Pfister .................... G06T 11/60
                                                              345/426
2010/0277477 A1*   11/2010  Wang .................... G06T 15/506
                                                              345/426
(Continued)

FOREIGN PATENT DOCUMENTS

KR      10-1495299        2/2015
KR      10-2018-0062959   6/2018

OTHER PUBLICATIONS

Hui et al )"Shape and Spatially-Varying Reflectance Estimation from Virtual Exemplars", Pattern Analysis and Machine intelligence, vol. 39, No. 10, Oct. 2017 (Year: 2017).*

(Continued)

*Primary Examiner* — Shervin K Nakhjavan
(74) *Attorney, Agent, or Firm* — Blank Rome LLP (57) ABSTRACT

Disclosed are herein a three-dimensional (3D) object acquisition method and an object acquisition apparatus using artificial light photographs. A 3D object acquisition method according to an embodiment of the present invention includes receiving a plurality of images of a 3D object photographed by a camera, reconstructing spatially-varying bidirectional reflectance distribution functions for the 3D object based on the plurality of images received, estimating shading normals for the 3D object based on the reconstructed spatially-varying bidirectional reflectance distribu- (Continued)

tion functions, and acquiring 3D geometry for the 3D object based on the estimated shading normals.

17 Claims, 6 Drawing Sheets

(58) Field of Classification Search
CPC ............... G06T 15/60; G06T 15/80; G06T 2207/10152; G06T 15/00; G06K 9/46; G06K 2209/40; G06K 9/00208
See application file for complete search history.

(56) References Cited

U.S. PATENT DOCUMENTS

| | | | | |
|---|---|---|---|---|
| 2013/0093883 | A1* | 4/2013 | Wang | H04N 1/00087 348/142 |
| 2015/0079327 | A1* | 3/2015 | Kautz | B33Y 50/02 428/64.1 |
| 2016/0224861 | A1* | 8/2016 | Vogh, Jr. | G06K 9/4661 |
| 2019/0295318 | A1* | 9/2019 | Levinson | G06N 20/00 |
| 2019/0347526 | A1* | 11/2019 | Sunkavalli | G06K 9/46 |
| 2021/0215539 | A1* | 7/2021 | Glinec | G01J 3/508 |

OTHER PUBLICATIONS

Dan B Goldman el al: "Shape and Spatially-Varying BRDFs from Photometric Stereo", IEEE Transactions on Pattern Analysis and Machine Intelligence, IEEE Computer Society, USA, vol. 32, No. 6, Jun. 2010, pp. 1060-1071.

Georgoulis Stamatios et al: "Tackling shapes and BRDFs Head-On", 2014 $2^{nd}$ International Confernce on 3D Vision, IEEE, vol. 1, Dec. 8, 2014, pp. 267-274.

Zhuo Hui et el: "Shape and Spatially-Varying Reflectance Estimation from Virtual Exemplars", IEEE Transactions on Pattern Analysis and Machine Intelligence, vol. 39, No. 10, Oct. 2017, pp. 2060-2073.

European Search Report dated Dec. 15, 2020.

* cited by examiner

3D OBJECT ACQUISITION METHOD AND APPARATUS USING ARTIFICIAL LIGHT PHOTOGRAPH

RELATED APPLICATIONS

This application is a national phase application of PCT/KR2019/013099, filed Oct. 7, 2019, which claims priority to Korean Application No. 10-2019-0120410, filed Sep. 30, 2019, Korean Application No. 10-2018-0173852 filed on Dec. 31, 2018 and Korean Application No. 10-2018-0119872 filed Oct. 8, 2018. The entire contents of those applications are incorporated herein by reference.

TECHNICAL FIELD

The present invention relates to a three-dimensional object acquisition technology, and more particularly, a method and device for measuring or acquiring shape information and bidirectional reflectance distribution functions of a 3D object from a photograph or image taken in an environment where artificial light, for example, a flash is turned on.

BACKGROUND ART

Acquiring and reproducing the appearance of a real-world object is one of the main goals of computer graphics, and a variety of methods have been proposed, from a method relying on specialized hardware to a method relying on mobile setups. However, there is an inevitable tradeoff between the capabilities of these methods and their cost. For example, mobile methods are cheap but are limited to near-planar geometries.

Capturing the spatially-varying bidirectional reflectance distribution functions (SVBRDFs) of a nonplanar 3D object with an off-the-shelf camera such as a smartphone camera has not yet been implemented due to its following technical challenges.

First, capturing SVBRDF information requires dense sampling of a light-view space. This requirement is usually achieved with professional supporting structures such as light domes or four-dimensional gantries. The built-in flash of a conventional camera is almost colocated with the lens, which leads to a severely limited sampling of the light-view space. Moreover, near-field flash light (or flash light) illuminates an object unevenly.

Second, since the vast majority of conventional cameras lack a depth sensor, recovering geometry must rely on passive multiview stereo techniques that assume diffuse reflectance only. However, in the presence of spatially-varying bidirectional reflectance, this leads to inaccurate reconstructions.

Third, due to the unstructured nature (or artificial nature) of hand-held acquisition, pixel correspondences between 3D points in the object and 2D pixels in multiple images are not guaranteed. These correspondences are guaranteed in a photometric stereo setup, where a fixed camera and various light sources are used, or the cameras and lights are locked in a physical structure, providing structured input. In a hand-held approach, both the intrinsic/extrinsic parameters as well as the 3D geometry of the object should be given, which are information which are unknown. The resulting misalignments are the main hindrance of high-quality reconstruction of 3D geometry and SVBRDF with an unstructured capture setup.

Most acquisition methods using a conventional camera focus either on geometry or reflectance capture exclusively, while simultaneous acquisition of both the reflectance capture and the geometry usually requires specialized hardware such as a mechanized gantry, a light stage, or a commercial 3D scanner.

Previous works may be classified as follows: (a) reflectance capture from known 3D geometry; (b) reflectance capture limited to 2D planar geometry; (c) 3D reconstruction assuming diffuse reflection only; and (d) simultaneous acquisition of reflectance and 3D geometry.

One example technique for reflectance capture from known 3D geometry has introduced a method of capturing SVBRDFs of known 3D objects that include clustered basis reflectances. Per-texel reflectance is progressively refined with linear blending. Another example technique proposes an SVBRDF acquisition method that jointly optimizes reflectance bases and blending weights on known 3D geometry, which aims at finding the smallest number of basis reflectances, then blending them smoothly. However, these techniques require a commercial 3D scanner to accurately capture an input 3D geometry.

Conventional cameras, such as smartphone cameras, have also been used to capture reflectance information of planar surfaces. One example of technique for reflectance capture limited to 2D planar geometry using an LCD screen and a camera has proposed an efficient SVBRDF capture method restricting the range of angular reflectance samples, as well as a two-shot, flash/no-flash reflectance acquisition method for the particular case of stationary materials, for which larger areas can be synthesized from small reconstructions. Another example technique captures the appearance of near-flat objects using a smartphone camera from varying viewpoints, and the light source provides active illumination, from which normals and reflectance are estimated. Another example technique proposes a portable system consisting of a smartphone camera, a hand-held linear light source, and a custom-built BRDF chart, and the technique takes a short video of a target object along with the BRDF chart while moving the hand-held light tube, and recovers SVBRDFs from a linear combination of the reference BRDFs. Another example technique presents an acquisition setup similar to a method focusing on capturing reflectance of planar art paintings. Other acquisition systems that capture high-quality SVBRDFs on planar surfaces rely on more sophisticated hardware. For example, there is a way to offer simultaneous acquisition of reflectance and normals at microscopic scale, placing the sample in a small dome with computer-controlled LED illumination, and other systems include four-axis spherical gantries to sample many different light-camera combinations, linear light source reflectometry, or condenser lenses. These acquisition methods are also limited to near-flat objects.

Shading normals are often used to enhance geometric details, assuming diffuse-only reflectance for the whole object. One example technique for 3D reconstruction with diffuse assumption first get a base geometry using structure-from-motion (SfM) and multiview stereo (MVS), then update the geometry using estimated surface normals assuming diffuse reflectance. Another example technique runs Kinect Fusion to get a signed distance function of a surface and refine the distance function using surface shading cues. Yet another example technique uses two mobile devices, as a camera and light source respectively, and takes multiple images from a fixed viewpoint under various light directions and reconstructs the surface from photometric stereo. Other recent methods have further demonstrated the use of smartphone cameras, to capture the 3D shape of objects or even large scenes, and are again based on both SfM and MVS techniques. All these methods assume that the surface reflectance of the object being reconstructed is diffuse only, and therefore, cannot recover SVBRDF information.

Describing the simultaneous acquisition of reflections and 3D geometry, previous works that capture reflectance and 3D geometry simultaneously have relied on specialized hardware setups, whose prices may be as high as several hundred thousand dollars. For example, there are many light stage designs that rely on discrete spherical illumination with polarized light sources. One example technique has built a similar structure with an LED arm that orbits rapidly to create a continuous spherical illumination with harmonics patterns, another example technique has built a spherical gantry equipped with a projector-camera pair on two mechanical arms, using phase-shift patterns for 3D geometry, and other similar dome structures of multiple cameras have been presented. This structure uses structured light patterns for 3D geometry and represents reflectance as bidirectional texture functions (BTF).

In addition, there are more approachable methods that require less expensive hardware, such as a light probe, a multi-light structure, or an RGB-D camera. One example technique has built a multi-light device consisting of 72 LED lights on a circle board, which allows them to combine SfM and photometric stereo to get 3D geometry, which further estimates SVBRDF based on the 3D geometry, but do not use this information to refine the geometry or surface normals. Another example technique utilizes an environment map for estimating spherical illumination by capturing a light probe and then solves an inverse rendering problem. Still another example technique captures a video sequence of more than a thousand frames using a mechanical rotary stage, and this method requires per vertex dense sampling with at least two clear changes of illumination per vertex. Still another example technique relies on depth information using Kinect Fusion as well as spherical illumination or IR illumination from the depth camera. Recently, there has been proposed an SVBRDF acquisition method that can capture polarimetric appearance of both diffuse and specular reflection with high-resolution normals, relying on input geometry from structured lighting.

These systems either rely on specialized hardware, for example, hardware which is bulky, expensive to build, or hard to get, or alternatively make use of additional sources of information like multiple lights, spherical illumination, or depth. In addition, they usually require time-consuming calibration processes, while acquisition times are often in the order of several hours.

DETAILED DESCRIPTION OF THE INVENTION

Technical Problem

Embodiments of the present invention provide a method and apparatus for measuring or acquiring geometry information and bidirectional reflectance distribution functions (BRDFs) of a 3D object from photographs or images taken in a state where an artificial light, for example, flash is turned on.

Technical Solution

According to an embodiment of the present invention, a three-dimensional (3D) object acquisition method includes receiving a plurality of images of a 3D object photographed by a camera, reconstructing spatially-varying bidirectional reflectance distribution functions for the 3D object based on the plurality of images received, estimating shading normals for the 3D object based on the reconstructed spatially-varying bidirectional reflectance distribution functions, and acquiring 3D geometry for the 3D object based on the estimated shading normals.

The reconstructing of the spatially-varying bidirectional reflectance distribution functions may include estimating basis bidirectional reflectance distribution functions of the 3D object based on the received plurality of images, and reconstructing the spatially-varying bidirectional reflectance distribution functions based on the estimated basis bidirectional reflectance distribution functions and a spatially-varying weight map.

Furthermore, the 3D object acquisition method may further include acquiring a base geometry of the 3D object based on an extrinsic parameter of the camera and the plurality of images, and the reconstructing of the spatially-varying bidirectional reflectance distribution functions may include reconstructing the spatially-varying bidirectional reflectance distribution functions based on the plurality of images and the base geometry.

The reconstructing of the spatially-varying bidirectional reflectance distribution functions and the estimating of the shading normals may include reconstructing the spatially-varying bidirectional reflectance distribution functions using an inverse rendering method satisfying an image formation model that is preset for the camera and estimating the shading normals.

The acquiring of the 3D geometry may include acquiring the 3D geometry using a Poisson surface reconstruction method.

The reconstructing of the spatially-varying bidirectional reflectance distribution functions may include updating the spatially-varying bidirectional reflectance distribution functions based on the acquired 3D geometry and the plurality of images, the estimating of the shading normals may include updating the shading normals based on the updated spatially-varying bidirectional reflectance distribution functions, and the acquiring of the 3D geometry may include updating the 3D geometry based on the updated shading normals.

The receiving of the plurality of images may include receiving the plurality of images for the 3D object taken in a state in which an artificial light is turned on.

Furthermore, the 3D object acquisition method may further include acquiring a 3D point cloud for the 3D object from the plurality of images and a pose of the camera using multi-view stereo, generating a base mesh for the 3D object based on the 3D point cloud and a Poisson surface reconstruction method, and acquiring an initial geometry for the 3D object by sub-dividing the base mesh, and the reconstructing of the spatially-varying bidirectional reflectance distribution functions may include reconstructing the spatially-varying bidirectional reflectance distribution functions based on the plurality of images and the initial geometry.

According to an embodiment of the present invention, a three-dimensional (3D) object acquisition method includes receiving a plurality of images of a 3D object photographed by a camera in a state in which an artificial light is turned on, and acquiring spatially-varying bidirectional reflectance distribution functions and 3D geometry of the 3D object based on the plurality of images received and the Poisson surface reconstruction method.

The acquiring of the spatially-varying bidirectional reflectance distribution functions and the 3D geometry may include reconstructing the spatially-varying bidirectional reflectance distribution functions based on the plurality of images received, estimating shading normals for the 3D object based on the reconstructed spatially-varying bidirectional reflectance distribution functions, and acquiring the 3D geometry based on the estimated shading normals and the Poisson surface reconstruction method.

According to an embodiment of the present invention, a three-dimensional (3D) object acquisition apparatus includes a receiving unit that receives a plurality of images of a 3D object photographed by a camera, a reconstructing unit that reconstructs spatially-varying bidirectional reflectance distribution functions of the 3D object based on the plurality of images received, an estimating unit that estimates shading normals for the 3D object based on the reconstructed spatially-varying bidirectional reflectance distribution functions, and an acquiring unit that acquires 3D geometry for the 3D object based on the estimated shading normals.

The reconstructing unit may estimate basis bidirectional reflectance distribution functions of the 3D object based on the received plurality of images, and reconstruct the spatially-varying bidirectional reflectance distribution functions based on the estimated basis bidirectional reflectance distribution functions and a spatially-varying weight map.

The reconstructing unit may acquire base geometry of the 3D object based on extrinsic parameters of the camera and the plurality of images, and reconstruct the spatially-varying bidirectional reflectance distribution functions based on the plurality of images and the base geometry.

The reconstructing unit and the estimating unit may reconstruct the spatially-varying bidirectional reflectance distribution functions using an inverse rendering method satisfying an image formation model that is preset for the camera and estimates the shading normals.

The acquiring unit may acquire the 3D geometry based on a Poisson surface reconstruction method.

The reconstructing unit may update the spatially-varying bidirectional reflectance distribution functions based on the acquired 3D geometry and the plurality of images, the estimating unit may update the shading normals based on the updated spatially-varying bidirectional reflectance distribution functions, and the acquiring unit may update the 3D geometry based on the updated shading normals.

The receiving unit may receive the plurality of images for the 3D object taken in a state in which an artificial light is turned on.

The reconstructing unit may acquire a 3D point cloud of the 3D object from the plurality of images and a pose of the camera by using a multi-view stereo, generate a base mesh for the 3D object based on the 3D point cloud and a Poisson surface reconstruction method, acquire an initial geometry for the 3D object by sub-dividing the base mesh and reconstruct the spatially-varying bidirectional reflectance distribution functions based on the plurality of images and the initial geometry.

According to another embodiment of the present invention, a three-dimensional (3D) object acquisition method includes receiving a plurality of images of a 3D object photographed by a camera, reconstructing spatially-varying bidirectional reflectance distribution functions for the 3D object based on the plurality of images received, and acquiring 3D geometry for the 3D object based on the reconstructed spatially-varying bidirectional reflectance distribution functions.

The reconstructing of the spatially-varying bidirectional reflectance distribution functions may include reconstructing the spatially-varying bidirectional reflectance distribution functions for the 3D object based on the received plurality of images and depth information for the 3D object.

Advantageous Effects of the Invention

According to the embodiments of the present invention, it is possible to measure the geometry information and the bidirectional reflectance distribution functions (BRDFs) of the 3D object simultaneously using a camera equipped with a general flash, which had been conventionally measured only by using specialized equipment.

According to the embodiments of the present invention, it is possible to measure high-quality three-dimensional geometry information and BRDF bidirectional reflectance distribution functions without relying on specialized equipment, thus affecting the spread of three-dimensional scanning technology.

The present invention is a technology required for ultra-realistic rendering of a three-dimensional model, and thus may be applied to virtual reality and augmented reality technology and various applications using the same.

BEST MODE

Advantages and features of the present invention and methods for achieving them will be apparent with reference to embodiments described below in detail in conjunction with the accompanying drawings. However, the present invention is not limited to the embodiments disclosed below, but can be implemented in various forms, and these embodiments are to make the disclosure of the present invention complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the invention. The singular expressions include plural expressions unless the context clearly dictates otherwise. In this specification, the terms "comprises" and/or "comprising" are intended to specify the presence of stated features, integers, steps, operations, elements, parts or combinations thereof, but do not preclude the presence or addition of steps, operations, elements, parts, or combinations thereof.

Unless defined otherwise, all terms (including technical and scientific terms) used herein have the same meanings as commonly understood by one of ordinary skill in the art to which this invention belongs. Further, unless explicitly defined to the contrary, the terms defined in a generally-used dictionary are not ideally or excessively interpreted.

Hereinafter, preferred embodiments of the present invention will be described in detail with reference to the accompanying drawings. The same reference numerals are used for the same components in the drawings, and duplicate descriptions of the same components are omitted.

It is difficult to capture spatially-varying bidirectional reflectance distribution functions (SVBRDFs) of 3D objects with just a single hand-held camera, such as an off-the-shelf smartphone or a DSLR camera. Existing techniques are limited to planar geometry or rely on a previously-scanned 3D geometry, thus limiting their practicality and presenting several technical challenges that need to be overcome. A built-in flash of a camera is almost colocated with the lens, and at a fixed position, which severely hampers sampling procedures in the light-view space. Moreover, the near-field flash lights the object partially and unevenly. In terms of geometry, existing multiview stereo techniques assume diffuse reflectance only, which leads to overly smoothed 3D reconstructions.

A main object of embodiments of the present invention is to simultaneously measure geometry information and bidirectional reflectance distribution functions (BRDF) of a 3D object using a camera equipped with a general flash, which had been conventionally measured only by using specialized equipment.

That is, the present invention may present a simple yet powerful framework that removes the need for expensive, dedicated hardware, enabling simultaneously measurement of the geometry information and SVBRDF information of an actual 3D object with a single camera with a built-in flash.

The present invention may provide high-quality 3D geometry reconstructions, including more accurate high-frequency details than state-of-the-art multi-view stereo technology by eliminating diffuse reflection assumption and utilizing the SVBRDF information.

The present invention formulates the joint reconstruction of SVBRDFs, shading normals, and 3D geometry as a multi-stage, iterative inverse-rendering reconstruction pipeline and also directly applicable to any existing multiview 3D reconstruction technique.

Here, the joint reconstruction is performed on a multi-stage, for example, iterative and alternating optimization inverse-rendering pipeline, which progressively improves 3D-to-2D correspondences, leading to high-quality reconstruction of both SVBRDFs and 3D geometry.

Figure 1:
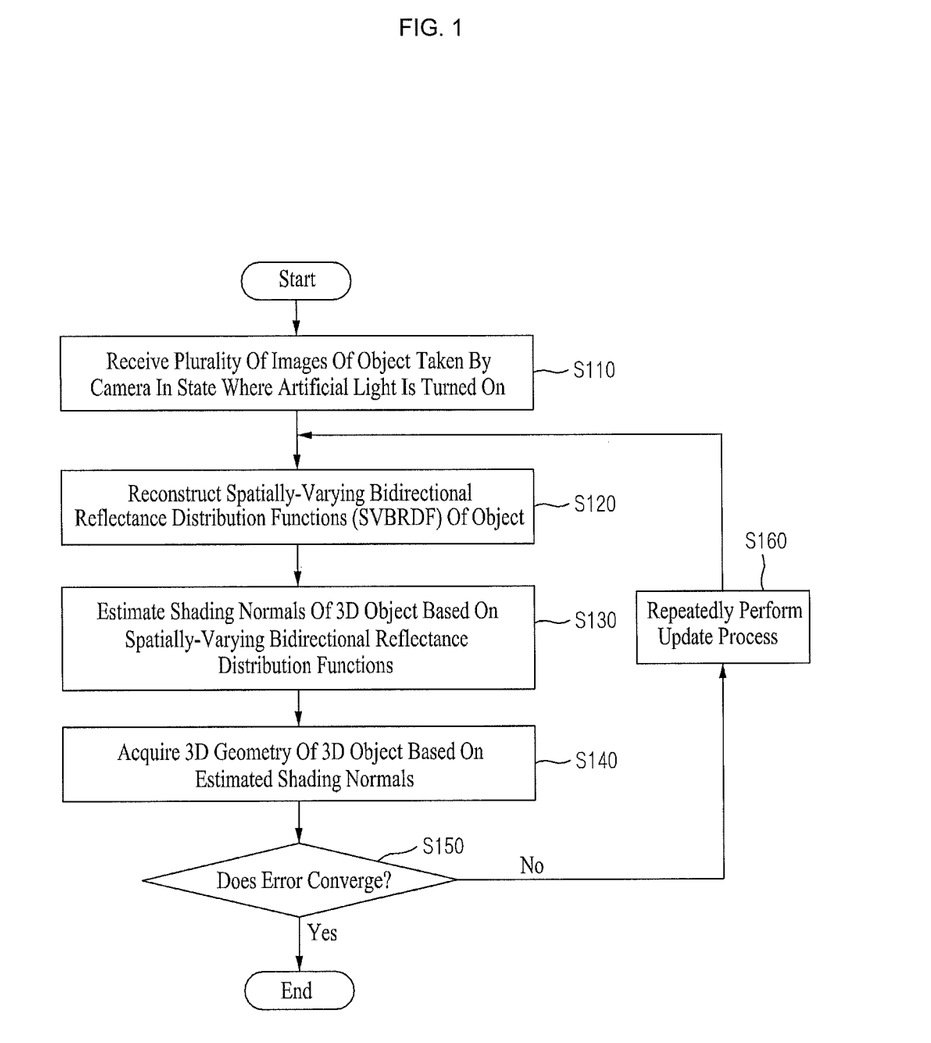
FIG. 1 illustrates an operation flowchart illustrating a 3D object acquisition method according to an embodiment of the present invention.

FIG. 1 is an operation flowchart illustrating a 3D object acquisition method according to an embodiment of the present invention.

Referring to FIG. 1, the 3D object acquisition method according to the embodiment of the present invention includes receiving a plurality of images of a 3D object photographed by a camera while an artificial light is turned on (S110).

In step S110, the plurality of images, for example, photographs taken with two different exposures may be received.

When the plurality of images photographed under the artificial illumination are received in step S110, spatially-varying bidirectional reflectance distribution functions (SVBRDF) of the 3D object may be reconstructed based on the received plurality of images (S120).

In step S120, basis bidirectional reflectance distribution functions (BRDF) for the 3D object may be estimated based on the plurality of received images, and the SVBRDF may be reconstructed based on the estimated basis bidirectional reflectance distribution functions and a spatially-varying weight map.

When the SVBRDF for the 3D object is reconstructed in the step S120, a shading normal of the 3D object may be estimated based on the reconstructed SVBRDF, and a 3D geometry of the 3D objects is acquired based on the estimated shading normals (S130 and S140).

In step S140, the 3D geometry may be acquired using the Poisson surface reconstruction technique.

When the 3D geometry is acquired in step S140, it is determined whether error converges, and when the error does not converge, the SVBRDF, the shading normal, and the 3D geometry may be updated by repeatedly performing update (S150 and S160).

Although not shown in FIG. 1, the method according to an embodiment of the present invention may further include acquiring a 3D point cloud of the 3D object from the plurality of images and a pose of the camera by using a multi-view stereo, generating a base mesh for the 3D object based on the 3D point cloud and the Poisson surface reconstruction technique, acquiring an initial geometry for the 3D object by sub-dividing the base mesh, and step S120 may include reconstructing the SVBRDF based on the plurality of images and the initial geometry.

The method according to the present invention will be described in detail with reference to FIGS. 2 to 5 as follows.

Table 1 below defines variables used in the present invention.

TABLE 1

| | |
|---|---|
| $x_p$ | 3D position of p-th vertex, p = 1, . . . , P |
| $n_p$ | geometric normal of $x_p$ |
| $\bar{n}_p$ | shading normal of $x_p$ |
| $l_{p,k}$ | light direction of $x_p$ at k-th camera |
| $o_{p,k}$ | view direction of $x_p$ at k-th camera |
| $L(o_{p,k}; x_p)$ | outgoing radiance from $x_p$ towards $o_{p,k}$ |
| $L(-l_{p,k}; x_p)$ | incoming radiance at $x_p$ from $-l_{p,k}$ |
| f(i, o; x, n) | BRDF at x |
| $f_b(i, o)$ | b-th basis BRDF, b = 1, . . . , B |
| $\omega_{p,b}$ | blending weight of $f_b$ at $x_p$ |
| $v_{p,b}$ | visibility of $x_p$ at $l_k$ |
| $F_b$ | set of basis BRDFs, $\{f_b\}$ |
| W | set of blending weights, $\{\omega_{p,b}\}$ |
| N | set of shading normals, $\{\bar{n}_p\}$ |
| X | set of 3D points, $\{x_p\}$ |

Figure 2:
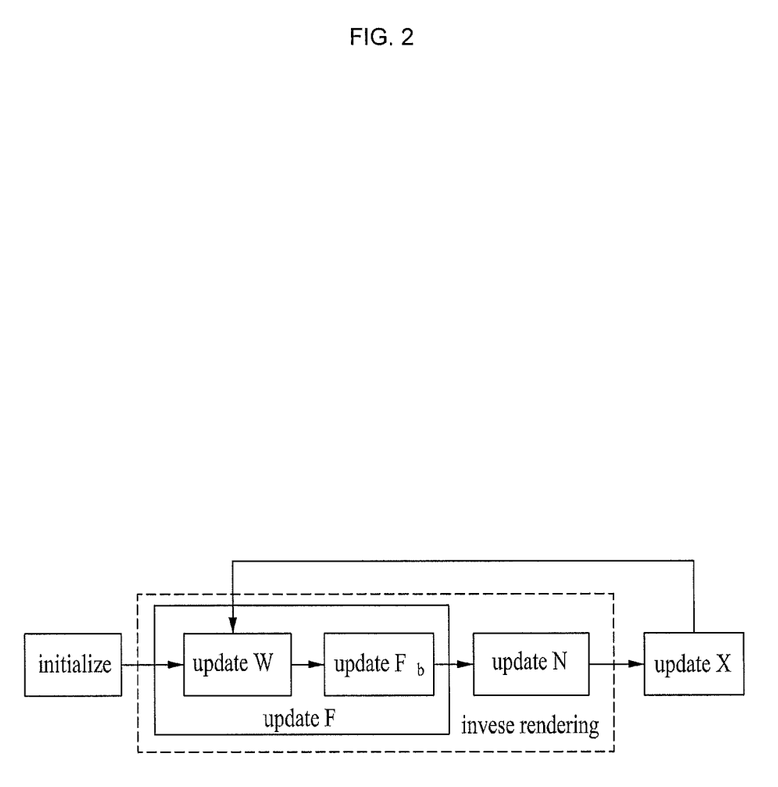
FIG. 2 illustrates an exemplary view for describing the outline of a three-dimensional object acquisition method according to the present invention.

FIG. 2 illustrates an exemplary view for describing the outline of a three-dimensional object acquisition method according to the present invention.

As shown in FIG. 2, the method of the present invention uses an artificial light image captured by a general camera, for example, a handheld camera, as an input.

In this case, the input may consist of a set of K artificial light images l={lk} taken with two different exposures to extend a dynamic range, and the lk may be converted into linear radiance LK by accounting for exposure variation.

Then, the invention may perform formalization by acquiring SVBRDF information F defined by a set of BRDFs Fb and corresponding weight maps W, shading normals N, and 3D geometry X. First, the present invention may acquire camera extrinsic parameters and a rough base geometry using a conventional 3D reconstruction technique that includes structural from motion (SfM), multiview stereo (MVS), and mesh reconstruction in an initialization step. Subsequently, the present invention may simultaneously reconstruct the SVBRDF information while improving recovered 3D geometry by using an iterative process. The iterative process may start with an inverse rendering stage whose goal is to obtain first approximation for W, Fb and N.

The method according to the present invention may reconstruct the SVBRDF information F, estimate the shading normals N that rely on the SVBRDF information. After obtaining W, Fb and N, the method according to the present invention updates details of the 3D geometry X with variant input of the shading normals N by means of the Poisson surface reconstruction, which makes it possible to additionally force photometric consistency in the reconstruction.

Here, the present invention may repeat inverse rendering and geometric reconstruction until the error converges.

The present invention may only need to estimate a position of a flash with respect to the camera, and camera optical parameters, and estimation of the position of the flash and the camera optical parameters may be performed only once. Here, the present invention may use multiple chrome ball images and checkerboard images.

Image Formation Model

The present invention may use an off-the-shelf conventional camera with a built-in flash to capture a set of artificial light photographs as input. Since the dynamic range of a conventional camera is insufficient to capture detailed specular reflections under the flash illumination, it is performed to change the exposure time Δt, for example, it is performed to change the exposure time Δt or a flash intensity Δg in the case of cellular phones with a fixed flash light amount. Here, the flash intensity may correspond to the EV number in a DSLR camera. The image formation model for a pixel position u may be formulated as in Equation 1 below.

$$I(u)=L(o;x)\Delta t\Delta g \quad \text{[Equation 1]}$$

Where I(u) is a captured image, and L(o; x) is outgoing radiance emitted from a point x on the 3D geometry in a view direction o.

The captured radiance at the point x may be formulated as a reflection equation such as Equation 2 below.

$$L(o;x)=f(i,o;x,n)L(-i;x)(n\cdot i) \quad \text{[Equation 2]}$$

Where f(i, o; x, n) is a reflectance function at the point x, n is a normal vector, and L(−i; x) is incident light at x from a light vector i.

Finding Correspondences

In a handheld setup, information about multiple exposures may be stored per point x in 3D rather than per pixel u in 2D. Thus, the present invention may need to obtain a geometric relationship between x and u.

First, the present invention may obtain intrinsic parameters of the camera by using a method capable of acquiring the intrinsic parameters. Here, the method of acquiring the intrinsic parameters may include a variety of methods, and a detailed description thereof will be omitted because such a method is obvious to those skilled in the art.

In a step of obtaining the intrinsic parameters of the camera, an initial relationship between a camera pixel $u \in R^2$ and its corresponding captured surface point $x \in R^3$ is calculated as a perspective projection matrix $\pi \in R^{3 \times 3}$. Because photographs are captured without any supporting structure, a rotation/translation transformation matrix $[R|t] \in R^{3 \times 4}$ that define extrinsic relationship between the camera and the surface point for each photograph using SfM is obtained. In addition, the present invention incrementally update the intrinsic parameters such as focal length for each picture using SfM for more accurate geometric correspondences by compensating the focus breathing effect due to auto-focusing. The resulting intrinsic and extrinsic parameters define the geometric relationship between pixel u and point x in Equation 1, as $[u, 1]^T = \pi[R|t][x,1]^T$.

Initial Geometry

The present invention may obtain a dense 3D point cloud using MVS from the captured images and camera poses. However, this initial point cloud usually suffers from severe high-frequency noise due to specular reflections created by the flash illumination, which violates the underlying diffuse texture assumption of the MVS method. Thus, to mitigate this noise, the present invention creates a low-resolution mesh, for example a $2^7$-voxel grid mesh using the screened Poisson surface reconstruction. Subsequently, the present invention may subdivide the low-resolution mesh to obtain a finer mesh, for example a $2^{10}$-grid mesh, which is used as the initial geometry of our method. Despite the high resolution of this initial geometry, fine geometric details are missing since they have been removed together with noise during the Poisson reconstruction step. Thus, the present invention may recover these details using an iterative geometry update algorithm.

Spatially-Varying Reflectance and Normals

The present invention may obtain SVBRDF (W, $F_b$) and normal information (N) from an input photo. Given a set of P surface (vertex) points $X=\{x_p\}$ captured in different light/view directions ik and ok of K photos, the captured radiance may be represented as $L=\{L(o_k;x_p)\}$. The present invention may formulate, as Equation 3 below, the inverse-rendering problem of satisfying the image formation model of Equation 2 by finding a set of two unknowns $\{f(i_{p,k}, o_{p,k}; x_p, n_p), n_p\}$ that minimizes an objective function.

$$O = \sum_{p=1}^{P} \sum_{k=1}^{K} v_{p,k}(L(o_{p,k}; x_p) - f(i_{p,k}, o_{p,k}; x_p, n_p)L(-i_{p,k}; x_p)(n_p \cdot i_{p,k}))^2 \quad \text{[Equation 3]}$$

Where $v_{p,k}$ is a visibility function of the vertex $x_p$ of an image k.

The inverse rendering problem of factorizing reflections and shadows is a very ill-posed and underdetermined problem. The present invention may utilize an iterative optimization method that updates four unknown elements W, Fb, N and X until a rendering result satisfies an input image. In addition, the present invention may test optimized parameters with a data set that is not used by separating an input photograph into different training and test data sets to prevent overfitting. First, the present invention may reconstruct the entire space of SVBRDF and acquire normal by using the information.

Reconstructing the SVBRDF (F)

To acquire the SVBRDF F, the present invention may estimate a set $F_b=\{f_b\}$ of basis BRDF, and blend a spatially-varying weight map W and the estimated set of basis BRDF. In this case, the reconstructed SVBRDF F may be formulated as in Equation 4 below.

$$F = \{f(i, o; x_p)\} = \left\{\sum_{b=1}^{B} \omega_{p,b} f_b(i, o)\right\} \quad \text{[Equation 4]}$$

Where $W=\{w_{p,b}\}$ is a set of per-point blending weights.

Flash Photography Setup

Figure 3:
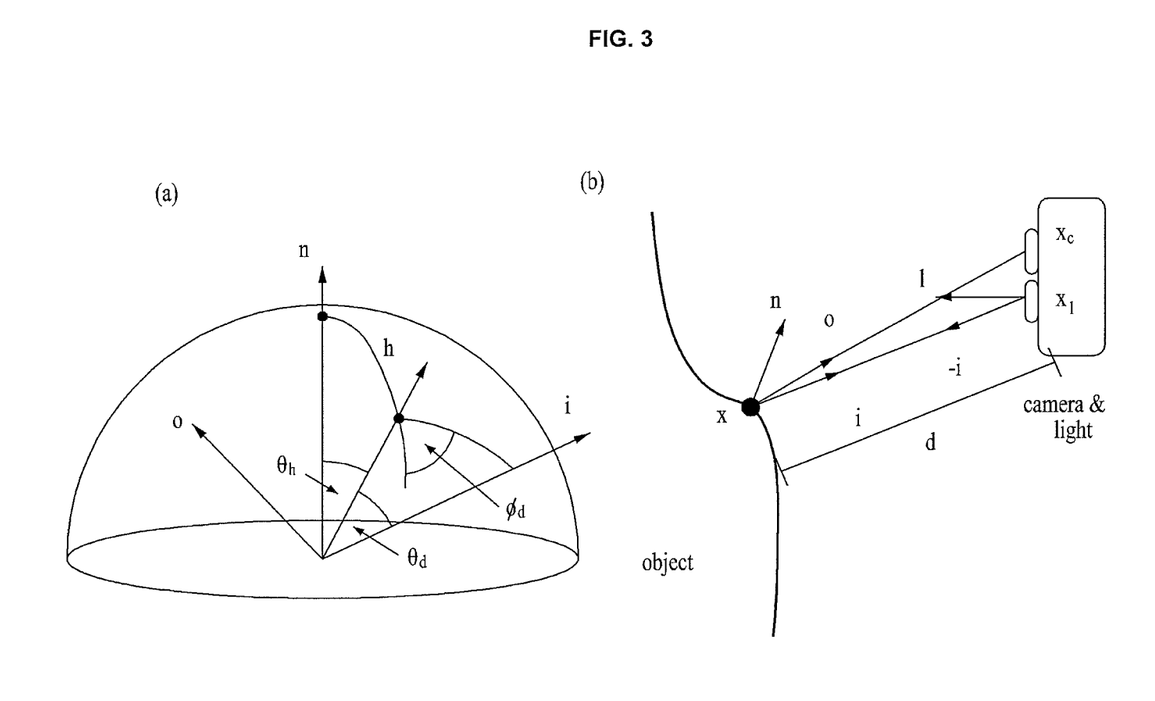
FIG. 3 illustrates an exemplary view of Rusinkiewicz parameters (a) of light and a camera and geometry (b) of the present invention with a smartphone.

To obtain the BRDF, dense sampling of $\theta_h$, $\theta_d$ and $\varphi_d$ is required as shown in FIG. 3A. The sampling is typically performed using additional supporting hardware. The Fresnel effect strongly depends on $\theta_d=\cos^{-1}$ (h·i), while the specular reflection varies rapidly as a function of $\theta_h=\cos^{-1}$ (h·n). Here, h is a halfway vector.

On the other hand, the reflection is kept substantially constant along $\varphi_d$, which is the azimuth angle of the light i around h. Dense sampling is included in the data set captured in the setup of the present invention along the $\theta_h$ and $\varphi_d$ dimensions. However, as shown in FIG. 3B, dense sampling leads to a single sample for $\theta_d$ at about ~5° because the light and camera are fixed and very close in the setup of the present invention. Here, the angle $\theta_d=5°$ is an optimal angle for single shot capture.

Reflectance Model

The present invention uses a Cook-Torrance (CT) model with a non-parametric normal distribution function (NDF) term for a better representation of specular reflection. As mentioned above, the present invention does not rely on an analytical function such as Beckmann to perform dense sampling along the angles $\theta_h$ and $\varphi_d$. The basis reflection model fb of the present invention may be expressed as Equation 5 below.

$$f_b(i, o) = \frac{\rho_d}{\pi} + \rho_s \frac{D(h)G(n, i, o)F(h, i)}{4(n \cdot i)(n \cdot o)} \quad \text{[Equation 5]}$$

Where $\rho_d$ and $\rho_s$ are the diffuse and specular albedos, D is a univariate NDF term for specularity, G is the geometric term, and F is the Fresnel term.

Our NDF is represented as a non-parametric tabulated function $D(\theta_h) \in R^M$. The present invention may set M=90, so that each element stores the BRDF value at corresponding $\theta_h$ with the square root mapping of angles. The present invention may use the V-groove cavity model for the shadowing/masking term G. Since there is no observation of the Fresnel effect in the setup, the present invention may set the term F as a constant. In practice, this setup may help reduce complexity during the optimization. In this case, this approximation may be effective better than using a constant index of refraction (IOR) value for the Fresnel term.

Reconstructing SVBRDF

The present invention may represent the basis BRDF in Equation 5 as a coefficient vector $f_b=[\rho_d, \rho_s FD(\theta_h)]^T \in \mathbb{R}^{M+1}$. It is noted that the geometric factor G is excluded from the coefficient vector. The present invention converts captured radiance into captured reflectance $f'_{p,k}$ from Equation 2. Given this captured reflectance $f'_{p,k}$ and a measurement vector $\Phi_{p,k} \in \mathbb{R}^{M+1}$ specifying the sampled $\theta_h$ angles and the geometric factor G/(4(n·i)(n·o)) per pixel observation, the present invention obtains $\bar{f}_{p,k}=\Phi_{p,k}^T f_b$. The present invention blends the basis BRDFs fb and spatial weights $\omega_{p,b}$ to approximate $\Sigma_{b=1}^B \omega_{p,b} f_b$. The present invention may then reformulate Equation 3 as an objective function to reconstruct the basis BRDFs and its corresponding weights as Equation 6 below.

$$\underset{F_b, W}{\text{minimize}} \sum_{p=1}^{P} \sum_{k=i}^{K} v_{p,k} \left( f'_{p,k} - \Phi_{p,k}^T \sum_{b=1}^{B} \omega_{p,b} f_b \right)^2 \quad \text{[Equation 6]}$$

For a more stable separation of diffuse and specular reflection, the present invention may clamp $D(\theta_h>60)$ to zero, following existing distribution functions such as Beckmann and GGX. In addition, the present invention may impose non-negative and monotonicity constraints on $D(\theta_h)$. For example, $D(\theta_h)$ may monotonically decrease as $\theta_h$ increases. The present invention does not impose a smoothness constraint in order to reproduce strong specular peaks more accurately. To update $F_b$, the present invention may minimize Equation 6 while keeping W fixed. It becomes a quadratic programming problem on $F_b$ with sparse input data. In this case, the present invention may use a commercial sparse quadratic programming solver.

Reconstructing W

The present invention may first estimate a set of diffuse components of the basis BRDF Fb by averaging color observations around the median brightness per vertex, clustering materials using Kmean in CIELAB space. This leads to an initial binary-labeled set of weights W. The basis BRDFs is still a challenge. For example, it may be possible to determine the number of basis progressively in an ad-hoc manner and increase the number until the optimization converges. In this case, the number of basis may be set by using existing technique, and the number of basis may vary depending on a situation.

In subsequent iterations, the present invention may update W using the estimated $F_b$ from the previous optimization. Updating W with fixed $F_b$ in Equation 6 is equivalent to minimizing the following objective function on each point $x_p$ as in Equation 7 below.

$$\underset{\omega_p}{\text{minimize}} \frac{1}{2} \|Q\omega_p - r\|^2 \text{ s.t. } \omega_{p,b} > 0, \sum_{b=1}^{B} \omega_{p,b} = 1. \quad \text{[Equation 7]}$$

The k-th row in $Q \in \mathbb{R}^{K \times B}$ is $[f_1(i_{p,k}, o_{p,k}), \ldots, f_B(i_{p,k}, o_{p,k})]$, the k-th element of $r \in \mathbb{R}^K$ is $L(o_{p,k}; x_p)/L(-i_{p,k}; x_p)/(n_p \cdot i_{p,k})$. The present invention may apply the visibilities $v_{p,k}$ and additional weights $w_{p,k}=\cos(\theta_i)\sin(\theta_h)$ to each element of both Q and r. The cosine terms compensate for the unstable observations at grazing angles, while the sine terms prevent bias towards specular observations. Minimizing Equation 7 is a standard quadratic programming problem. In this case, the present invention may solve the problem using the convex quadratic programming solver.

Color

The present invention may use color basis BRDFs and monochromatic blending weights. When updating $F_b$, the present invention may optimize each color channel independently and when updating W, the present invention may optimize blending weights of each vertex (apex) using all color channels.

Reconstructing Normals (N)

The present invention may obtain basis BRDFs $F_b=\{f_b\}$ and blending weights $W=\{w_{p,b}\}$ to yield SVBRDFs F. The present invention may need to estimate a set of per-vertex shading normals $N=\{\tilde{n}_p\}$. Since estimating surface normal with BRDFs is again a severely ill-posed problem, the present invention may apply an iterative optimization. First, the present invention may feed initial surface normals $n_p$ from the current geometry which is updated in the previous iteration as input variable for BRDF f at point $x_p$ in Equation 3. Since incoming/outgoing radiance, incoming/outgoing directions, and the reflection of the vertex are all known, the present invention may factorize shading normals $\tilde{n}_p$ using a standard linear least squares regression with no constraints. It is noted that geometric normals $n_p$ at point xp are different from shading normal $ñ_p$. As the present invention iterates the optimizations, the difference between $n_p$ and $x_p$ gradually converges. Since observations at grazing and mirror-reflection angles are less reliable, the present invention may introduce an additional weight taking into account illumination angles, as $w_p=\cos(θ_i) \sin(θ_h)$. In this case, $θ_i=\cos^{-1}(n·i)$ and the sine term may prevents potential bias towards misaligned surface normals and specular reflectance from previous estimations.

Geometry Update with Photometric Consistency

Figure 4:
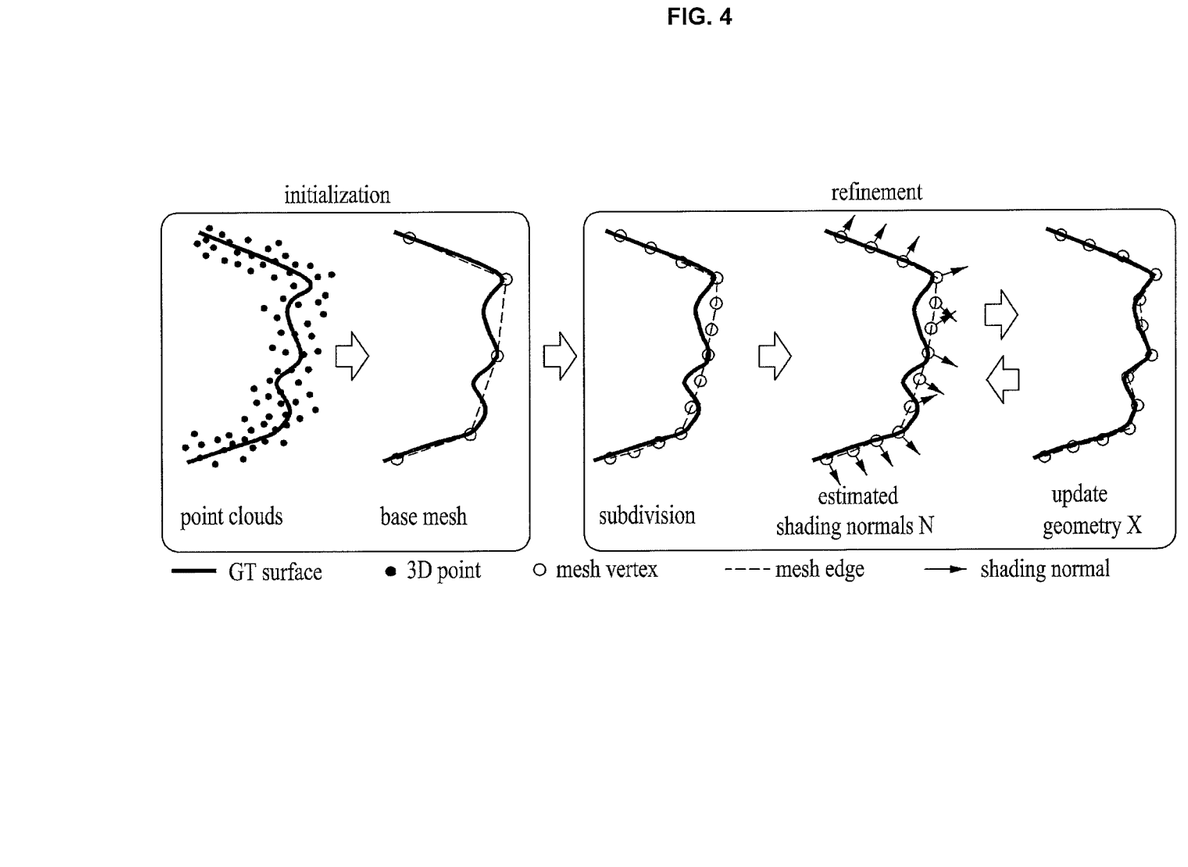
FIG. 4 illustrates an exemplary view for describing a process of updating 3D geometry.

After estimating weights W, basis BRDFs $F_b$ and shading normals N, the present invention may reconstruct the geometry X that agrees with the shading observations. FIG. 4 illustrates an exemplary diagram for describing a process of updating three-dimensional geometry. As shown in FIG. 4, a process of updating the initial geometry includes obtaining a rough base geometry (or base mesh) from an initial point cloud and then subdividing into a finer mesh. Then, the present invention may estimate shading normals using the subdivided mesh and update the geometry with the estimated shading normal. Here, the geometry update may be performed using at least one of the Nehab's method and the screened Poisson reconstruction method. Although in principle both methods can preserve both low- and high-frequency details, the Nehab's method transfers surface gradients to the target geometry directly, while the Poisson method employs a coarse-to-fine reconstruction. This is a crucial difference in our unstructured capture setup, since the shading normals N may be assumed to contain high frequency noise, and the direct transfer in the Nehab's method would also transfer this noise. Thus, the present invention preferably uses the screened Poisson method, designed to reconstruct implicit surfaces using tri-quadratic B-spline basis functions in a voxel grid in the coarse-to-fine approach. This leads to a robust performance when integrating noisy surface normals to 3D geometry.

Figure 5:
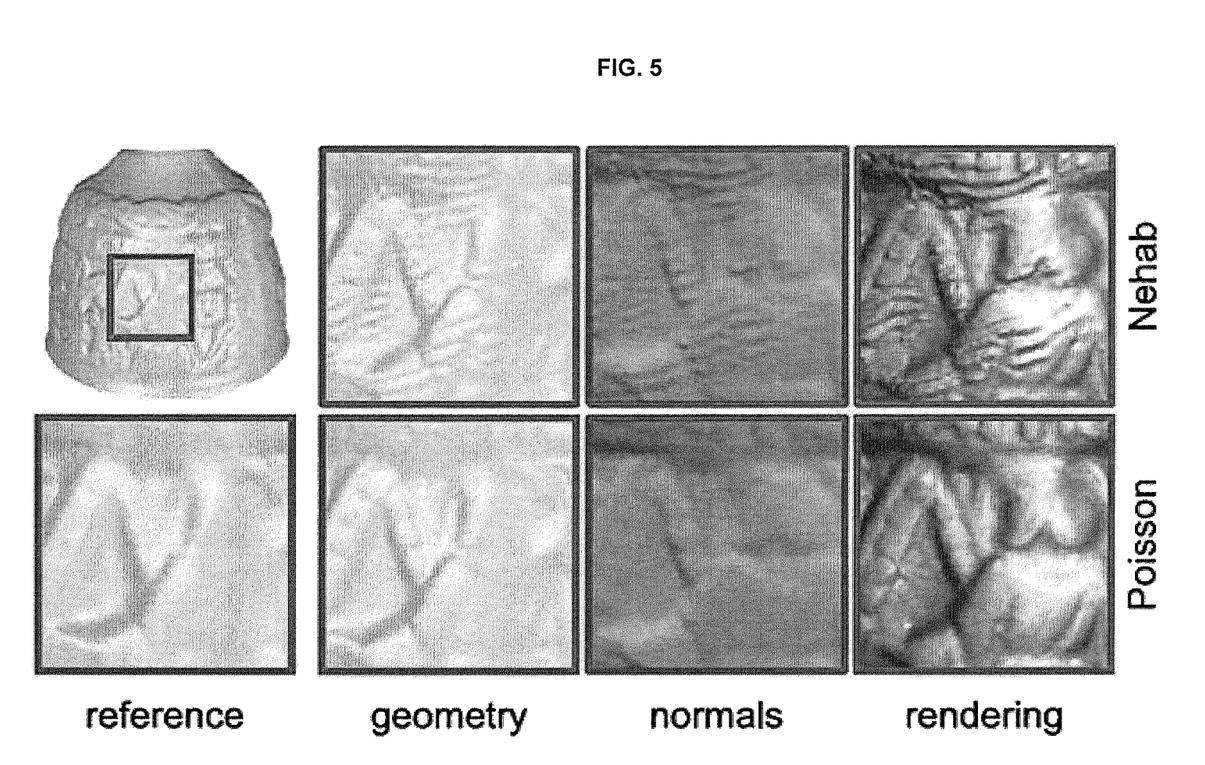
FIG. 5 illustrates an exemplary view of comparison between the Nehab method and the screened Poisson reconstruction method for unstructured capture setup of the present invention.

FIG. 5 illustrates an exemplary diagram showing a comparison between the Nehab method and the screened Poisson reconstruction method for unstructured capture setup. As shown in FIG. 5, the result of Nehab method contains high-frequency noise from the estimated shading normals in the unstructured capture setup, while the geometry from the screened Poisson method presents cleaner details by handling the input noise robustly through its coarse-to-fine reconstruction.

The screened Poisson method reconstructs an implicit surface $\hat{χ}$ from an input point cloud as in Equation 8 below.

$$\underset{χ}{\text{minimize}} \int \|V(x_p) - \nabla_χ(x_p)\|^2 dx_p + α \sum_{x_p \in X} X^2(x_p) \quad \text{[Equation 8]}$$

Where V: $\mathbb{R}^3 \to \mathbb{R}^3$ is a vector field derived from the set of shading normals N, $\nabla χ(x_p)$ is the gradient of the implicit scalar surface function, $χ: \mathbb{R}_3 \to \mathbb{R} χ^2(x_p)$ is the squared distance between a point $x_p$ and the implicit surface $χ$, and α is the weight of the regularization term.

The present invention may determine $α \in [0.1, 4.0]$ depending on the confidence of the initial geometry. For discretizing the implicit surface function $χ$, it is possible to set the resolution of a voxel grid to $2^9$ or $2^{10}$ for each dimension, which roughly corresponds to 0.1-0.2 mm for a physical objects captured.

While the original algorithm employs geometric normals, the present invention may aim to find an implicit surface $\hat{χ}$ whose gradients match $ñ_p$ using the shading normals $ñ_p$. That is, each vertex should present consistent shading when different view and light directions are given. Once the implicit function is determined, the present invention may apply marching cubes to convert the implicit surface to a polygonal mesh.

The present invention may iteratively update W, $F_b$, N, and X until the present invention finds the optimal 3D geometry and SVBRDF. The present invention may evaluate a Hausdorff distance between a previous mesh and a new X. The present invention may repeat the whole process in FIG. 2 until the test RMS error of the photometric difference in Equation 3 starts to increase. To avoid overfitting, the present invention may randomly separate captured images into training and testing groups with a 9:1 ratio.

As described above, the 3D object acquisition method according to the embodiment of the present invention may simultaneously measure geometry information and spatially-varying bidirectional reflectance distribution functions (SVBRDF) of a 3D object using a general camera with a built-in flash, which had been conventionally measured only using specialized equipment.

In addition, the 3D object acquisition method according to an embodiment of the present invention may measure high-quality 3D geometry information and the SVBRDF without relying on the specialized equipment.

That is, the 3D object acquisition method according to an embodiment of the present invention may require just a single conventional camera with a built-in flash, for example, a smartphone camera because several artificial light photographs are used as input.

As described above, the key of the 3D object acquisition method according to an embodiment of the present invention is a novel joint reconstruction of SVBRDFs, shading normals, and 3D geometry, and the joint reconstruction is performed on a multi-stage, iterative and alternating optimization inverse-rendering pipeline, which progressively improves 3D-to-2D correspondences, leading to high-quality reconstruction of both the SVBRDFs and the 3D geometry.

Furthermore, the method according to the embodiments of the present invention reconstructs spatially-varying bidirectional reflectance information for a three-dimensional object based on a plurality of images taken by a camera and acquires three-dimensional geometry for the 3D object based on the reconstructed spatially-varying bidirectional reflectance information, not limited to estimating shading normals for the 3D object using the spatially-varying bidirectional reflectance information and then acquiring the 3D geometry for the 3D object based on the estimated shading normals. That is, the method according to another embodiment of the present invention may employ various methods capable of acquiring 3D geometry for the 3D object based on the spatially-varying bidirectional reflectance information. Accordingly, the method according to another embodiment of the present invention may reconstruct spatially-varying bidirectional reflectance distribution functions for a three-dimensional object based on a plurality of images taken by a camera and acquire three-dimensional geometry for the 3D object based on the reconstructed spatially-varying bidirectional reflectance distribution functions.

Furthermore, the technical configuration of reconstructing spatially-varying bidirectional reflectance distribution functions for a three-dimensional object in the method according to the embodiments of the present invention described above is not limited to being reconstructed only by a plurality of images taken by a camera and additional depth information, that is, depth information for the 3D object may be reflected to improve the weight and speed of the algorithm. For example, the method according to embodiments of the present invention may reconstruct spatially-varying bidirectional reflectance distribution functions for a three-dimensional object based on depth information for the three-dimensional object as well as a plurality of images taken by the camera.

In this case, the depth information of the 3D object may be separately obtained using a depth camera or may be obtained using various measurement techniques. For example, the present invention may obtain depth information for a 3D object using a multi-view camera or obtain depth information for the 3D object using stereo matching. Of course, the method of acquiring depth information in the present invention is not limited to the above-described method, and any method applicable to the present invention may be used The method of reconstructing spatially-varying bidirectional reflectance distribution functions of the 3D object by using the depth information may be applied to the above description.

Figure 6:
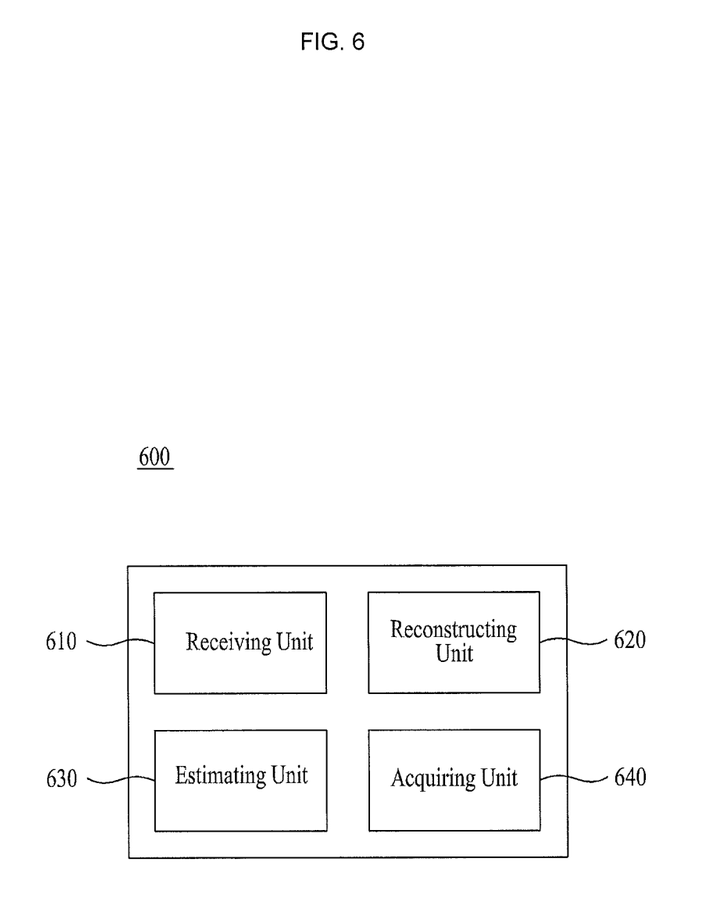
FIG. 6 illustrates a configuration of a 3D object acquisition method according to an embodiment of the present invention.

FIG. 6 illustrates a configuration of an apparatus for acquiring a 3D object according to an embodiment of the present invention, and illustrates a conceptual configuration of an apparatus for performing the methods of FIGS. 1 to 5.

Referring to FIG. 6, an apparatus 600 for acquiring a 3D object according to an embodiment of the present invention may include a receiving unit 610, a reconstructing unit 620, an estimating unit 630, and an acquiring unit 640.

The receiving unit 610 may receive a plurality of images of a 3D object photographed by a camera.

In this case, the receiving unit 610 may receive a plurality of images of the 3D object photographed while an artificial light is turned on.

The reconstructing unit 620 may reconstruct spatially-varying bidirectional reflectance distribution functions of the 3D object based on the plurality of images received.

In this case, the reconstructing unit 620 may estimate basis bidirectional reflectance distribution functions of the 3D object based on the plurality of images, and reconstruct spatially-varying bidirectional reflectance distribution functions based on the estimated basis bidirectional reflectance distribution functions and a spatially-varying weight map.

In this case, the reconstructing unit 620 may acquire a base geometry of the 3D object based on extrinsic parameters of the camera and the plurality of images, and reconstruct spatially-varying bidirectional reflectance distribution functions based on the plurality of images and the base geometry.

In this case, the reconstructing unit 620 may reconstruct spatially-varying bidirectional reflectance distribution functions by using an inverse rendering technique that satisfies an image formation model that is preset for the camera.

Furthermore, the reconstructing unit 620 may update spatially-varying bidirectional reflectance distribution functions based on the 3D geometry and the plurality of images which are acquired by the acquiring unit 640.

Furthermore, the reconstructing unit 620 may acquire a 3D point cloud of the 3D object from the plurality of images and a pose of the camera by using a multi-view stereo, generate a base mesh for the 3D object based on the 3D point cloud and the Poisson surface reconstruction technique, acquire an initial geometry for the 3D object by sub-dividing the base mesh and reconstruct spatially-varying bidirectional reflectance distribution functions based on the plurality of images and the initial geometry.

The estimating unit 630 may estimate a shading normal for the 3D object based on the reconstructed spatially-varying bidirectional reflectance distribution functions.

In this case, the estimating unit 630 may estimate the shading normal using the reverse rendering technique that satisfies the image formation model that is preset for the camera.

Furthermore, when the spatially-varying bidirectional reflectance distribution functions is updated, the estimating unit 630 may update the shading normal based on the updated spatially-varying bidirectional reflectance distribution functions.

The acquiring unit 640 may acquire a 3D geometry based on the estimated shading normal and the Poisson surface reconstruction technique.

In this case, the acquiring unit 640 may acquire the 3D geometry using the Poisson surface reconstruction technique.

Furthermore, when the shading normal is updated, the acquiring unit 640 may update the 3D geometry based on the updated shading normal.

Although the description is omitted with reference to the apparatus of FIG. 6, components constituting FIG. 6 may include all the contents described with reference to FIGS. 1 to 5, which are obvious to those skilled in the art.

The apparatus described above may be implemented by a hardware component, a software component, and/or a combination thereof. For example, the apparatus and the components described in the embodiments of the present invention may be implemented using one or more general purpose computer or specific purpose computer such as a processor, a controller, an arithmetic logic unit (ALU), a digital signal processor, a microcomputer, a field programmable gate array (FPGA), a programmable logic unit (PLU), a microprocessor, or any other devices which are able to execute an instruction and respond to the instruction. A processing device may execute an operating system (OS) and one or more software applications performed in the OS. Further, the processing device may access, store, manipulate, process, and generate data in response to the execution of the software. For convenience of understanding, a case in which one processing device is used may be described, but those skilled in the art may understand that a plurality of processing elements and/or a processing element having a plurality of forms are included. For example, the processing device may include a plurality of processors or one controller and one processor. Further, other processing configuration such as a parallel processor may be possible.

The software may include a computer program, a code, an instruction, or one or more combinations thereof and configure the processing device to be operated as desired, or independently or collectively instruct the processing device. In order to be interpreted by the processing device or provide the instruction or the data to the processing device, the software and/or data may be permanently or temporarily embodied in any type of machine, a component, a physical device, a virtual equipment, a computer storage medium or device. The software may be distributed on a computer system connected through a network and be stored or executed in a distributed method. The software and the data may be stored in one or more computer readable recording media.

The method according to an embodiment of the present invention may be recorded in a computer readable medium by being implemented in the form of a program instruction which is executable using various computer means. The computer readable medium may include a program instruction, a data file, a data structure, or the like alone or in combination. The program instruction recorded in the medium may be specially designed and configured for an embodiment of the present invention or be well known to and used by those skilled in the art of computer software. Examples of the computer readable recording medium may include a hardware device which is specially configured to store and perform the program instruction such as a hard disk, a magnetic media such as a floppy disk and a magnetic tape, an optical media such as a compact disk-read only memory (CD-ROM) and a digital versatile disk (DVD), and a magneto-optical media such as a floptical disk, a read only memory (ROM), a random access memory (RAM), a flash memory, etc. Examples of the program instruction may include a machine language code which is made by a compiler, and may also include a high-level language code which is executable by a computer using an interpreter or the like.

While embodiments described hereinbefore are described with reference to limited embodiments and drawings, those of ordinary skill in the art may understand that various changes and modifications of the above-described embodiments are possible. For example, a proper result may be achieved even when the above-described embodiments may be performed in a sequence different from the method described above, and/or the components such as the above-described system, configurations, apparatuses, circuits and the like are coupled or combined in a form different from the method described above, or are replaced or substituted by other components or their equivalents.

Therefore, other implementations, other embodiments, and equivalents to the claims may also be included in the scope of the following claims.

The invention claimed is:

1. A three-dimensional (3D) object acquisition method comprising:
   receiving a plurality of images of a 3D object photographed by a camera;
   reconstructing spatially-varying bidirectional reflectance distribution functions for the 3D object based on the plurality of images received;
   estimating shading normals for the 3D object based on the reconstructed spatially-varying bidirectional reflectance distribution functions; and
   acquiring 3D geometry for the 3D object based on the estimated shading normals.

2. The method of claim 1, wherein the reconstructing of the spatially-varying bidirectional reflectance distribution functions includes
   estimating basis bidirectional reflectance distribution functions of the 3D object based on the received plurality of images, and reconstructing the spatially-varying bidirectional reflectance distribution functions based on the estimated basis bidirectional reflectance distribution functions and a spatially-varying weight map.

3. The method of claim 1, further comprising:
   acquiring a base geometry of the 3D object based on an extrinsic parameter of the camera and the plurality of images,
   wherein the reconstructing of the spatially-varying bidirectional reflectance distribution functions includes reconstructing the spatially-varying bidirectional reflectance distribution functions based on the plurality of images and the base geometry.

4. The method of claim 1, wherein the reconstructing of the spatially-varying bidirectional reflectance distribution functions and the estimating of the shading normals includes reconstructing the spatially-varying bidirectional reflectance distribution functions using an inverse rendering method satisfying an image formation model that is preset for the camera and estimating the shading normals.

5. The method of claim 1, wherein the acquiring of the 3D geometry includes acquiring the 3D geometry using a Poisson surface reconstruction method.

6. The method of claim 1, wherein the reconstructing of the spatially-varying bidirectional reflectance distribution functions includes updating the spatially-varying bidirectional reflectance distribution functions based on the acquired 3D geometry and the plurality of images,
   wherein the estimating of the shading normals includes updating the shading normals based on the updated spatially-varying bidirectional reflectance distribution functions, and
   wherein the acquiring of the 3D geometry includes updating the 3D geometry based on the updated shading normals.

7. The method of claim 1, wherein the receiving of the plurality of images includes receiving the plurality of images for the 3D object taken in a state in which an artificial light is turned on.

8. The method of claim 1, further comprising:
   acquiring a 3D point cloud for the 3D object from the plurality of images and a pose of the camera using multi-view stereo;
   generating a base mesh for the 3D object based on the 3D point cloud and a Poisson surface reconstruction method; and
   acquiring an initial geometry for the 3D object by subdividing the base mesh,
   wherein the reconstructing of the spatially-varying bidirectional reflectance distribution functions includes reconstructing the spatially-varying bidirectional reflectance distribution functions based on the plurality of images and the initial geometry.

9. A three-dimensional (3D) object acquisition method, comprising:
   receiving a plurality of images of a 3D object photographed by a camera in a state in which an artificial light is turned on; and
   acquiring spatially-varying bidirectional reflectance distribution functions and 3D geometry of the 3D object based on the plurality of images received and a Poisson surface reconstruction method, wherein the acquiring of the spatially-varying bidirectional reflectance distribution functions and the 3D geometry includes:
   reconstructing the spatially-varying bidirectional reflectance distribution functions based on the plurality of images received;
   estimating shading normals for the 3D object based on the reconstructed spatially-varying bidirectional reflectance distribution functions; and
   acquiring the 3D geometry based on the estimated shading normals and the Poisson surface reconstruction method.

10. A three-dimensional (3D) object acquisition apparatus, comprising:
   a receiving unit configured to receive a plurality of images of a 3D object photographed by a camera;

a reconstructing unit configured to reconstruct spatially-varying bidirectional reflectance distribution functions of the 3D object based on the plurality of images received;

an estimating unit configured to estimate shading normals for the 3D object based on the reconstructed spatially-varying bidirectional reflectance distribution functions; and an acquiring unit configured to acquire 3D geometry for the 3D object based on the estimated shading normals.

11. The apparatus of claim 10, wherein the reconstructing unit estimates basis bidirectional reflectance distribution functions of the 3D object based on the received plurality of images, and reconstructs the spatially-varying bidirectional reflectance distribution functions based on the estimated basis bidirectional reflectance distribution functions and a spatially-varying weight map.

12. The apparatus of claim 10, wherein the reconstructing unit acquires base geometry of the 3D object based on extrinsic parameters of the camera and the plurality of images, and reconstructs the spatially-varying bidirectional reflectance distribution functions based on the plurality of images and the base geometry.

13. The apparatus of claim 10, wherein the reconstructing unit and the estimating unit reconstructs the spatially-varying bidirectional reflectance distribution functions using an inverse rendering method satisfying an image formation model that is preset for the camera and estimates the shading normals.

14. The apparatus of claim 10, wherein the acquiring unit acquires the 3D geometry based on a Poisson surface reconstruction method.

15. The apparatus of claim 10, wherein the reconstructing unit updates the spatially-varying bidirectional reflectance distribution functions based on the acquired 3D geometry and the plurality of images, wherein the estimating unit updates the shading normals based on the updated spatially-varying bidirectional reflectance distribution functions, and wherein the acquiring unit updates the 3D geometry based on the updated shading normals.

16. The apparatus of claim 10, wherein the receiving unit receives the plurality of images for the 3D object taken in a state in which an artificial light is turned on.

17. The apparatus of claim 10, wherein the reconstructing unit acquires a 3D point cloud of the 3D object from the plurality of images and a pose of the camera by using a multi-view stereo, generates a base mesh for the 3D object based on the 3D point cloud and a Poisson surface reconstruction method, acquires an initial geometry for the 3D object by sub-dividing the base mesh and reconstructs the spatially-varying bidirectional reflectance distribution functions based on the plurality of images and the initial geometry.

* * * * *